United States Patent [19]
Degroote

[11] Patent Number: 5,973,470
[45] Date of Patent: Oct. 26, 1999

[54] COMPENSATION FOR GENERIC SERVOAMPLIFIER USAGE WITH HIGH PERFORMANCE DIRECT DRIVE VALVES

[75] Inventor: Steven H. Degroote, Creve Coeur, Mo.

[73] Assignee: McDonnell Douglas Corp., St. Louis, Mo.

[21] Appl. No.: 09/047,706

[22] Filed: Mar. 25, 1998

[51] Int. Cl.⁶ .................................................. G05D 23/275
[52] U.S. Cl. ...................... 318/632; 318/434; 364/474.38
[58] Field of Search .................... 318/434, 567, 318/600, 603, 615–618, 632, 638, 650, 652–655; 361/23, 31; 364/474.12, 474.15, 474.19, 474.3, 474.35

[56] References Cited

U.S. PATENT DOCUMENTS

| | | | |
|---|---|---|---|
| 3,808,486 | 4/1974 | Cuda et al. | 318/620 |
| 4,007,361 | 2/1977 | Martin | 318/561 |
| 4,556,956 | 12/1985 | Dickenson et al. | 364/162 |
| 4,597,048 | 6/1986 | Mazur et al. | 364/472 |
| 4,937,512 | 6/1990 | Takagi | 318/621 |
| 5,172,312 | 12/1992 | Iino et al. | 364/149 |
| 5,189,620 | 2/1993 | Parsons et al. | 364/431.02 |
| 5,216,342 | 6/1993 | Torii et al. | 318/568.1 |
| 5,374,884 | 12/1994 | Koren et al. | 318/632 |
| 5,412,302 | 5/1995 | Kido et al. | 318/685 |
| 5,552,690 | 9/1996 | Hiraoka | 318/632 |
| 5,568,142 | 10/1996 | Velazquez et al. | 341/126 |
| 5,579,243 | 11/1996 | Levine | 364/553 |
| 5,587,636 | 12/1996 | Bar-Kana et al. | 318/561 |
| 5,600,221 | 2/1997 | Tomatsuri et al. | 318/632 |
| 5,631,824 | 5/1997 | Khorrami | 364/176 |
| 5,652,490 | 7/1997 | Bradshaw et al. | 318/615 |

*Primary Examiner*—Jonathan Salata
*Attorney, Agent, or Firm*—Carlos M. Herrera

[57] ABSTRACT

A compensation design allows for use of a generic servoamplifier for multiple types of actuator Direct Drive Valves (DDV). Cost savings can be realized by using common electronics applied to multiple actuator types. The implementation allows for design of the compensation directly from experimentally or analytically derived frequency performance curves of the generic servoamplifier resulting in the performance comparable to a custom servoamplifier for the direct drive valves.

6 Claims, 7 Drawing Sheets

COMPENSATION FOR GENERIC SERVOAMPLIFIER USAGE WITH HIGH PERFORMANCE DIRECT DRIVE VALVES

This is the basic approach used, for example, in the F/A-18E/F SUPER HORNET® fighter/attack aircraft, as explained in McDonnell Douglas report number MDC 92B0454, Revision A, Oct. 7, 1994, "Servocylinder, Stabilator Interface Control Document," U.S. Government contract number N00019-92-C-0059.

FIELD OF THE INVENTION

The present invention relates to circuitry for providing optimum performance in high frequency dynamic direct drive valve controls.

BACKGROUND OF THE INVENTION

Typical high performance actuators are controlled by specialized analog electronics tailored specifically to the actuator type, even if the commands are synthesized digitally. Vehicles such as high performance aircraft typically have unique electronic circuits for each actuator type on that aircraft.

Such custom-designed actuators have a number of drawbacks. Safety-of-flight testing required for flight critical electronics cause an expensive and time-consuming requirement to qualify hardware, including reliability testing and failure mode and effects analysis. By contrast, modifying merely a software parameter or control equation for a new application would eliminate many of the hardware qualification testing requirements. Software test requirements would not increase significantly given that a new application would likely involve new software anyway. Moreover, a system such as an aircraft has different requirements at each control surface, and thus custom-designed actuators and associated loop closure designs for each. The cost of developing unique control electronics for each actuator type can be significantly higher than an approach that utilizes a common design throughout the vehicle. This concept can be extended to the utilization of common hardware across vehicle platforms and/or non-vehicular applications to achieve economies of scale. The present approach increases the logistical tail required to maintain and support the vehicles in terms of unique part numbers, technical publications, etc.

SUMMARY OF THE INVENTION

This invention satisfies the above needs. A novel servoamplifier compensation design and method allows for use of a generic servoamplifier for multiple types of actuator Direct Drive Valves (DDV). A cost savings can be realized by using common electronics applied to multiple actuator types. The implementation allows for design of the compensation directly from experimentally or analytically derived frequency performance curves of the generic servoamplifier and specific DDV resulting in the performance comparable to a custom servoamplifier for the direct drive valves.

A preferred version of an actuator loop closure electronic system for accepting an actuator position command input and electrically energizing a motor coil of a direct drive valve that provides valve position feedback, the direct drive valve in turn controlling an actuator, whose means of motive force may be a main ram, and the actuator providing actuator position feedback. To accomplish its function, the actuator loop closure electronic system comprises:

(A) a ram position error summer for generating a ram error signal from two inputs of an actuator position command and a ram position feedback signal;

(B) a valve position error summer for generating a valve error signal from two inputs of the ram error signal and a valve position feedback signal;

(C) a servoamplifier compensator for modifying the valve position error signal into a compensated valve position error signal;

(D) a servoamplifier comprised of a servoamplifier summer, a servoamplifier current drive, a servoamplifier current sensor, and a servoamplifier current feedback for electrically energizing the motor coil;

(E) the servoamplifier summer for generating a motor coil current error signal from two inputs of the compensated valve position error signal and a motor coil current feedback signal;

(F) a servoamplifier current drive for amplifying the motor coil current error signal to energize the motor coil;

(G) a servoamplifier current sensor for detecting current in the motor coil providing a sensed current signal; and (H) a servoamplifier current feedback for adjusting sensed current signal into a motor coil current signal;

and the servoamplifier compensator optimizing electrical energizing of the motor coil by the servoamplifier.

Preferably, the actuator loop closure electronic system with servoamplifier compensation is implemented digitally taking advantage of the flexibility of software programming the servoamplifier compensation design. However, it is highly likely that the servoamplifier portion itself would remain an analog design in order to avoid burdening the digital processors with high throughput processing requirements.

Preferably, the actuator loop closure electronic system with servoamplifier compensation would also incorporate digital sum and difference calculators for both the valve position feedback loop and ram position feedback loop with associated analog demodulators and analog-to-digital converters. This would allow implementation using common loop closure electronics for actuators having either center tapped LVDTs for critical applications requiring high levels of fault detection, or non-center tapped LVDTs for less critical applications.

It is a further objective of the present method to provide for a method for designing the servoamplifier compensator that comprises the following steps:

(A) computing a custom current loop frequency response of a custom servoamplifier matching and in combination with a direct drive valve;

(B) determining an unmatched current loop frequency response of an unmatched servoamplifier used in combination with said direct drive valve;

(C) calculating a frequency response ratio of said custom current loop frequency response to said unmatched current loop frequency response;

(D) finding a transfer function that fits said frequency response ratio over a frequency range of concern for said direct drive valve; and (E) implementing said transfer function into said servoamplifier compensator.

This method anticipates that determining an unmatched current loop frequency response could be performed analytically or from experimentally derived data from the actual servoamplifier and direct drive valve.

DETAILED DESCRIPTION OF THE INVENTION

The present invention now will be described more fully hereinafter with reference to the accompanying drawings, in which a preferred embodiment of the invention is shown. This invention may, however, be embodied in many different forms and should not be construed as limited to the embodiments set forth herein; rather, this embodiment is provided so that this disclosure will be thorough and complete, and will fully convey the scope of the invention to those skilled in the art. Like numbers refer to like elements throughout.

Figure 1A:
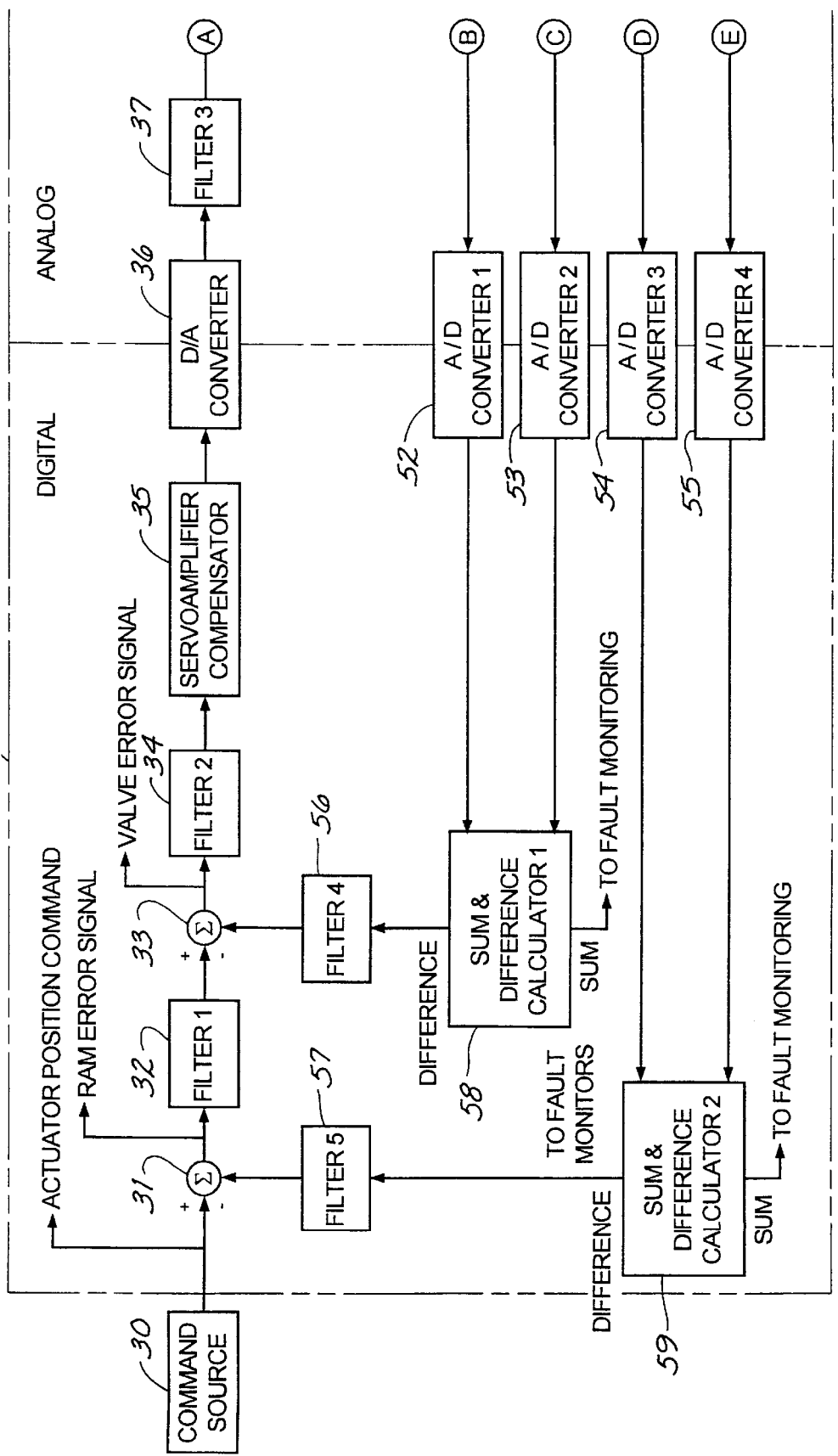
FIG. 1A & B is a schematic view of actuator loop closure with servoamplifier compensation.
Figure 1B:
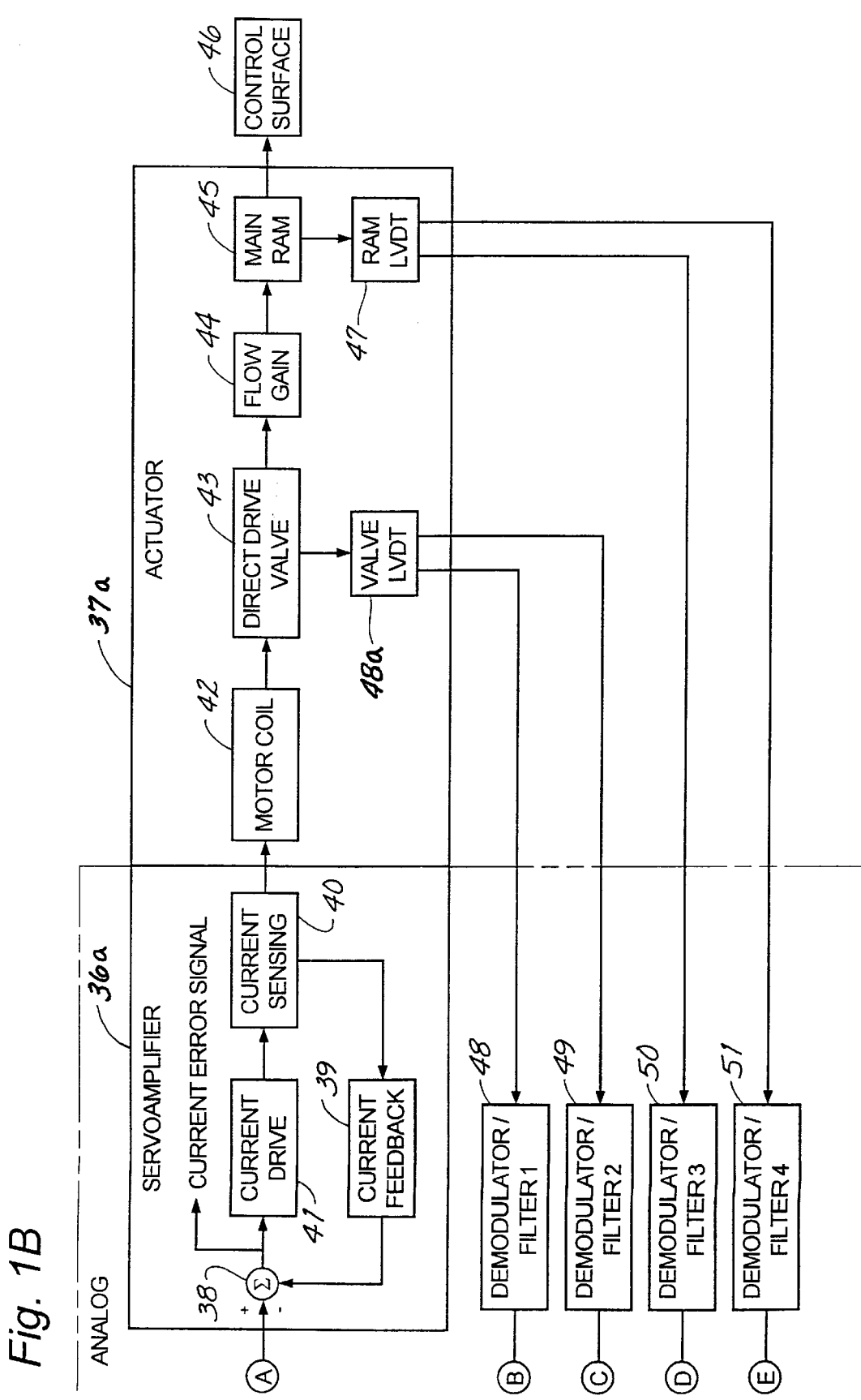

The following abbreviations are used in the figures and description:

A/D—analog-to-digital (converter)
C(jw)—transfer function of the custom servoamplifier
D/A—digital-to-analog (converter)
DDV—direct drive valve
G(jw)—transfer function of the generic servoamplifier
Hz—Hertz
jw—complex frequency in radians per second
K—gain constant
L—inductance
LVDT—linear variable differential transducer
R—resistance
s—Laplace transform domain variable
Σ—(greek letter "Sigma") mathematical symbol for summation
τ—(greek letter "tau") time constant A common means of controlling various actuator types is achievable using digital control techniques as shown in FIG. 1A & B. While a common digital design may be inherently more expensive for a single application, cost savings can be realized as the same hardware is applied to multiple applications. Under this approach, the various filters or compensators that are unique to the actuator are implemented in software which can easily be altered to suit the specific actuator. Unfortunately, not all of the functionality can easily be accomplished digitally. The sample rates required to implement the so called "current loop" digitally are very high which increases the performance requirements of the processor and therefore it's cost, especially if multiple actuators are to be controlled by one processor. An attractive design compromise is to control the Direct Drive Valve (DDV) current with an analog servoamplifier. As is the case with actuator control electronics in general, typical servoamplifier design practice is to tailor the servoamplifier response to the specific DDV interfaced to it. A technique for compensating for a mismatched servoamplifier/DDV pair has been developed which enables use of common, generic analog and digital hardware to control multiple DDV actuator types. Additionally, the technique also compensates for time delays caused by computational delays and D/A conversion.

Figure 2:
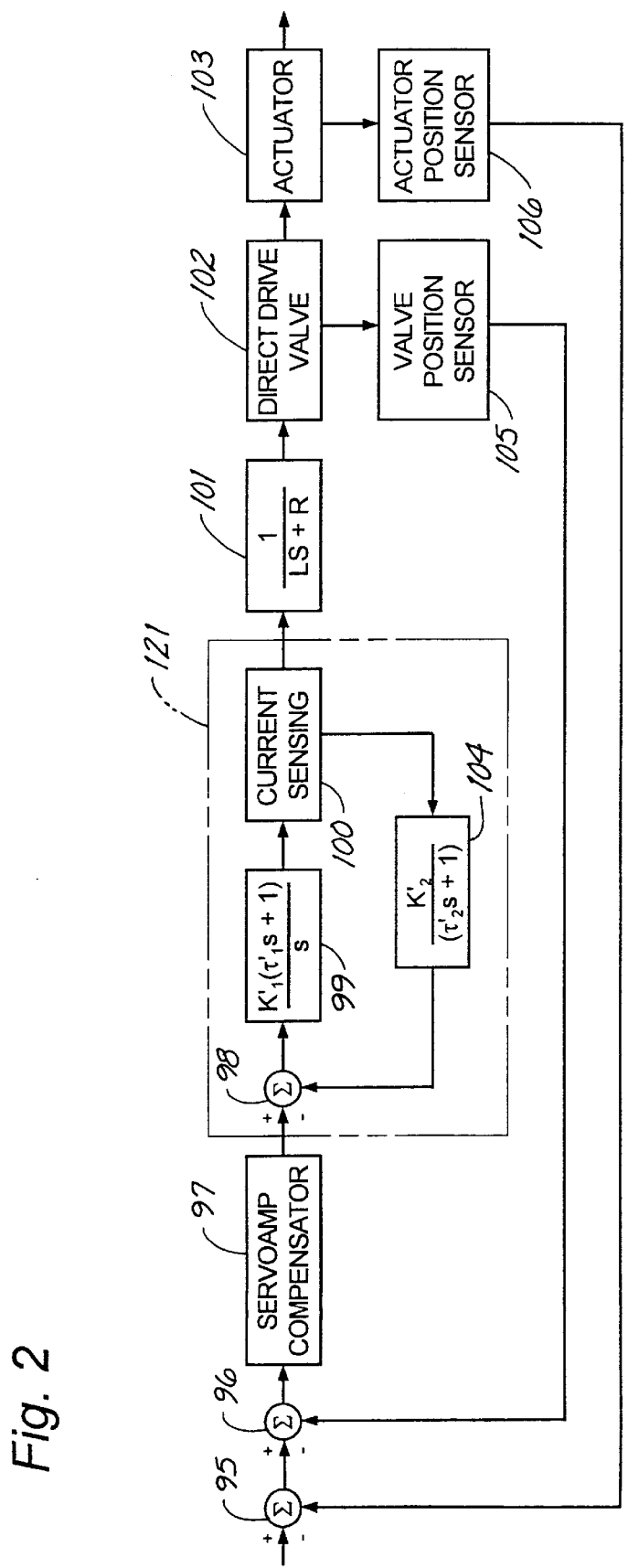
FIG. 2 is a functional diagram of actuator loop closure with servoamplifier compensation.

The inventive concept is illustrated in the functional block diagram of FIG. 2 in which the servoamplifier 121 is not designed specifically for the response characteristics of the motor coil. An actuator position error summer 95 receives an actuator position command and a ram position feedback signal from the ram loop and outputs an actuator position error signal. This signal is received by a valve position error summer 96 along with a valve position feedback signal. This valve position error summer 96 outputs a valve position error signal. This signal is modified by the servoamplifier compensator 97 in manner discussed below. The output from the servoamplifier compensator 97 is received by a generic servoamplifier 121 comprised of a servoamplifier summer 98, a servoamplifier current drive 99, a servoamplifier current sensor 100, and a servoamplifier current feedback 104 for electrically energizing the motor coil 101. The servoamplifier summer 98 receives the valve position error signal along with a motor coil current feedback signal and outputs a motor coil current error signal.

A servoamplifier current drive 99 amplifies the valve position error signal to energize the motor coil 101. Typically, this servoamplifier current drive 99 has a response in the form of $$\frac{K_1(\tau_1 s + 1)}{s},$$

where $K_1$ denotes a design gain factor, $\tau_1$ is a design time constant for adjusting the zero, and s is the Laplace transform variable. Common design practice is to pick the time constant, $\tau_1$ such that it cancels the time constant of the motor coil 101 which is determined by the ratio L/R. The gain, $K_1$ is selected to provide adequate closed loop bandwidth. It should also be noted that the servoamplifier current drive 99 may be of the continuous or pulse width modulated (PWM) type. In the case of a PWM amplifier, the design utilizes the inductance of the motor coil 101 to convert the voltage pulses into a continuous current. Those skilled in the art will recognize that a PWM amplifier has the advantage of lower power consumption.

A servoamplifier current sensor 100, such as a resistor in series with the motor coil 101, detects current in the motor coil providing a sensed voltage which is proportional to the current signal.

A current feedback 104 amplifies this sensed current signal with a transfer function typically designed in the form $$\frac{K_2}{(\tau_2 s + 1)},$$

where $K_2$ denotes a design gain factor and $\tau_2$ is a design time constant for adjusting the pole. The time constant, $\tau_2$ is selected to attenuate pulses introduced by the current drive 99 which is typically a Pulse Width Modulated (PWM) voltage source. The gain, $K_2$ is selected to provide the appropriate closed loop steady state gain. Those skilled in the art will recognize the current loop as a so called Type I system whose gain is determined by the ratio $1/K_2$. The current feedback 104 outputs the motor coil current feedback signal that is an input to the servoamplifier summer 98.

The motor coil 101 repositions the direct drive valve 102. The motor coil 101 typically have a dynamic response when electrically energized whose transfer function is typically in the form $$\frac{1}{Ls+R},$$

where L is the self and mutual inductance, the latter if multiple channels, and R is the coil resistance.

A valve position sensor 105 measures this repositioning of the direct drive valve 102 and sends a valve position feedback signal which is an input to the valve position error summer 96. The direct drive valve 102 provides a flow gain that is related to its position and this flow gain powers an actuator 103 whose movement is sensed by an actuator position sensor 106 which provides an actuator position sensor feedback signal that is an input to actuator position error summer 95.

In the inventive actuator loop closure with servoamplifier compensation the generic servoamplifier 121 would not be typically matched to the motor coil 101. Also, a servoamplifier compensator 97 is interposed between the valve position error summer 96 and servoamplifier summer 98. This servoamplifier compensator 97 could have a transfer function of many forms. In the preferred embodiment described below, a second-order digital filter was sufficient for fidelity in the frequency range of interest.

The custom design could be a legacy design if it exists, or a paper design based on existing design practice. The generic servoamplifier is selected to provide acceptable current loop stability for a wide variety of motor coil loads, which are defined by resistance (R) and inductance (L). As a result of design compromises to maintain stability for multiple motor coil types, current response for a given motor coil may have more or less bandwidth than is desired. Too little bandwidth could result in phase lag or delay, which could degrade overall actuator stability and/or response. Too much bandwidth could cause stability problems at higher frequencies or result in valve jitter. Within limits, compensation can remove the undesirable effects caused by the mismatched generic servoamplifier and motor coil. In a digital application, the compensator can also adjust for lags introduced by the D/A converter and analog smoothing filter.

Figure 5:
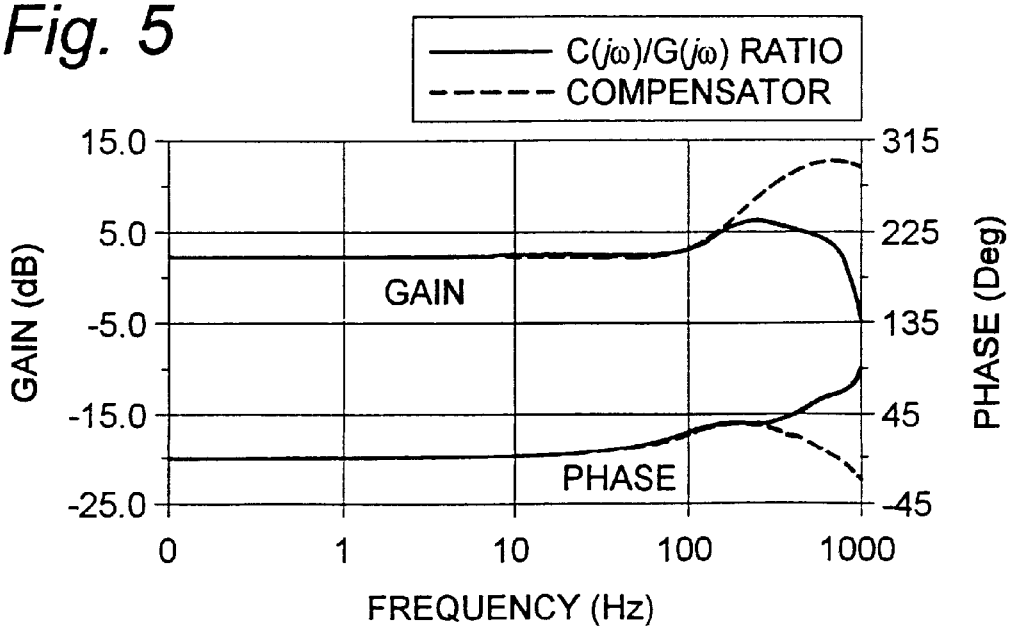
FIG. 5 is a plot of an analytical example of servoamplifier compensation design.

The servoamplifier compensation adjusts for these nonideal conditions so that the valve loop "sees" the equivalent of a custom, tailored servoamplifier/motor coil combination without digital effects in a relevant frequency band, typically up to 200 Hz for a high performance aircraft actuator application. The compensator design process uses analytical and/or measured frequency response data representing the closed loop current response as shown in FIG. 5. The ability to use measured data directly in the design process offers the advantage of compensating for observed phenomena which may not lend themselves to modeling analytically.

In the preferred embodiment, the inventive servoamplifier compensation concept is demonstrated by taking advantage of digital implementation. Referring to FIG. 1A & B, the inventive generic actuator loop control system 60 uses generic hardware and custom designed software for the given actuator 37a, both in the forward loop and feedback loops.

A command source 30 provides an actuator position command, which is typically a digital command. A ram position summer 31 outputs a ram error signal based on the digital actuator position command and a ram position feedback signal. Depending on the application and its operating environment, the ram error signal may then undergo conditioning by a first filter 32. A valve position summer 33 outputs a valve position error signal based on a valve position feedback signal and based on the ram error signal received from the first filter 32, if present, else from the ram position summer 31. Depending on the application and its operating environment, the valve error signal may undergo conditioning by a second filter 34. The filtered or unfiltered valve error signal then is compensated by the servoamplifier compensator 35. The compensated signal is returned to an analog signal by a D/A converter 36 and possibly filtered again by a third filter 37 prior to going to the servoamplifier 36a, which is comprised of a servoamplifier summer 38, a servoamplifier current drive 41, a servoamplifier current sensor 40, and a servoamplifier current feedback 39 for electrically energizing the motor coil 42. The servoamplifier summer 38 receives the valve position error signal along with a motor coil current feedback signal and outputs a motor coil current error signal. A servoamplifier current drive 41 amplifies the valve position error signal to energize the motor coil 42. A servoamplifier current sensor 40, such as a resistor in series with the motor coil 42, detects current in the motor coil providing a sensed current signal. A current feedback 39 amplifies and filters this sensed current signal, producing the motor coil current feedback signal that is an input to the servoamplifier summer 38.

The motor, by the energizing of the motor coil 42, repositions the direct drive valve 43. A valve linear variable differential transducer (LVDT) 48a senses the valve position. What is depicted is center-tapped LVDT which is typical in critical applications where fault monitoring is required. Consequently the valve LVDT outputs two signals referenced to the center tap. The direct drive valve 43 provides a flow gain 44 which in turn powers an actuator, in this case a main ram 45, whose movement is sensed by a ram LVDT 47 which provides a ram position feedback signal in a manner similar to the valve LVDT 48a.

In the preferred embodiment, these LVDTs 47–48a output an analog signal whereas it is preferred to process it digitally. Consequently, The outputs of the valve LVDT 48a are shown being processed by a first demodulator/filter 48 and a second demodulator/filter 49. The outputs from each are respectively go to a first or second A/D converter, 52 and 53. The outputs of the ram LVDT 47 are shown being processed by a third demodulator/filter 50 and a fourth demodulator/filter 51. The outputs from each are respectively go to a third or fourth A/D converter, 54 and 55. Note that multiple the A/D channels are implemented as a single multiplexed A/D converter to reduce cost in the preferred embodiment.

The inventive generic actuator loop closure electronic system 60 processes the valve position signals with built-in flexibility to accommodate application specific feedback from the valve LVDT 48a and ram LVDT 47. This flexible processing of feedback is accomplished by digitally implementing respectively a sum and difference function of the outputs from each center-tapped LVDTs as a first and second digital sum and difference calculator 58 and 59. This first sum and difference calculator 58 accepts the outputs from the first and second A/D converters 52 and 53. The second digital sum and difference device 59 accepts the outputs from the third and fourth A/D converters 54 and 55. The generic actuator loop closure electronic system 60 can thus be programmed to accept single output LVDT signals that do not require a sum and difference being taken as well as handling center-tapped LVDTs. Moreover, the Demodulator/filters 48–51 and A/D converters 52–55 can be omitted or bypassed should transducers with digital output be substituted.

Similar servoamplifier designs may be implemented as analog systems. In these instances, the A/D converters, 52–55, the D/A converter 36, and possibly the third filter 37, would thus be omitted from the design.

Also, the center-tapped, two output valve LVDT 48a and ram LVDT 47 are often substituted for other types of sensors, especially single tapped devices in less critical applications where fault monitoring is not desired. The choice of sensor would dictate what demodulation, if any, and filtering is added to the valve feedback loop and the actuator, or ram, feedback loop.

Figure 3:
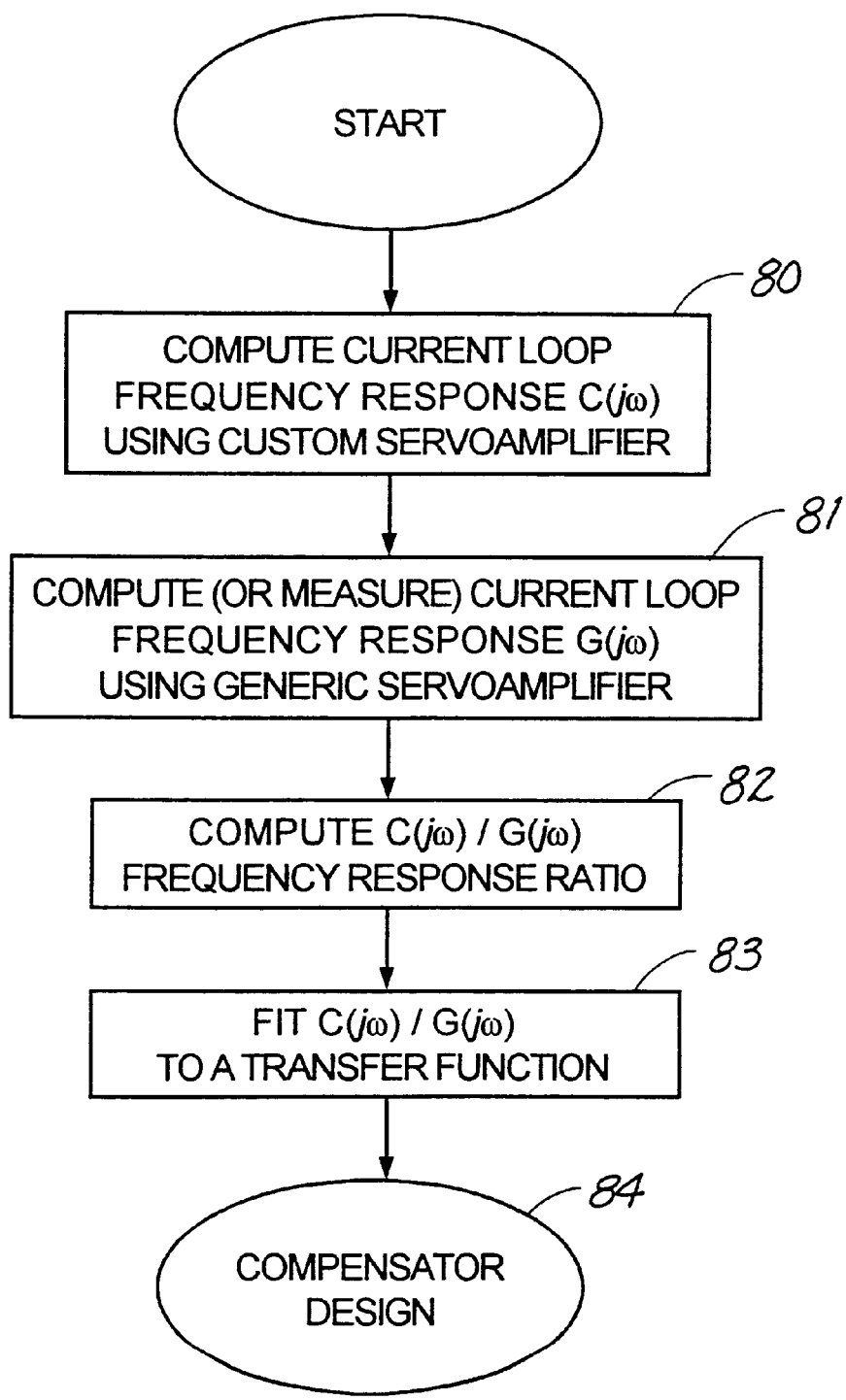
FIG. 3 is a flow diagram of servoamplifier compensation design process.

This generic actuator loop closure electronic system 60 gives value to a method for finding the design parameters for servoamplifier compensation. The method for designing the servoamplifier compensator is shown in FIG. 3.

Figure 4:
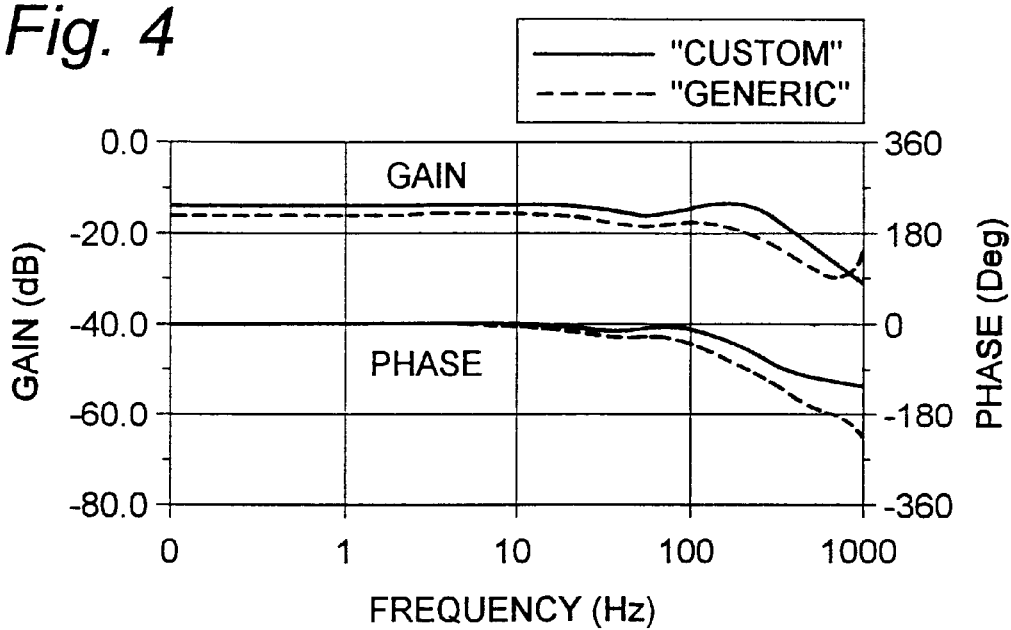
FIG. 4 is a plot of an analytical example of custom versus uncompensated generic current responses.
Figure 6:
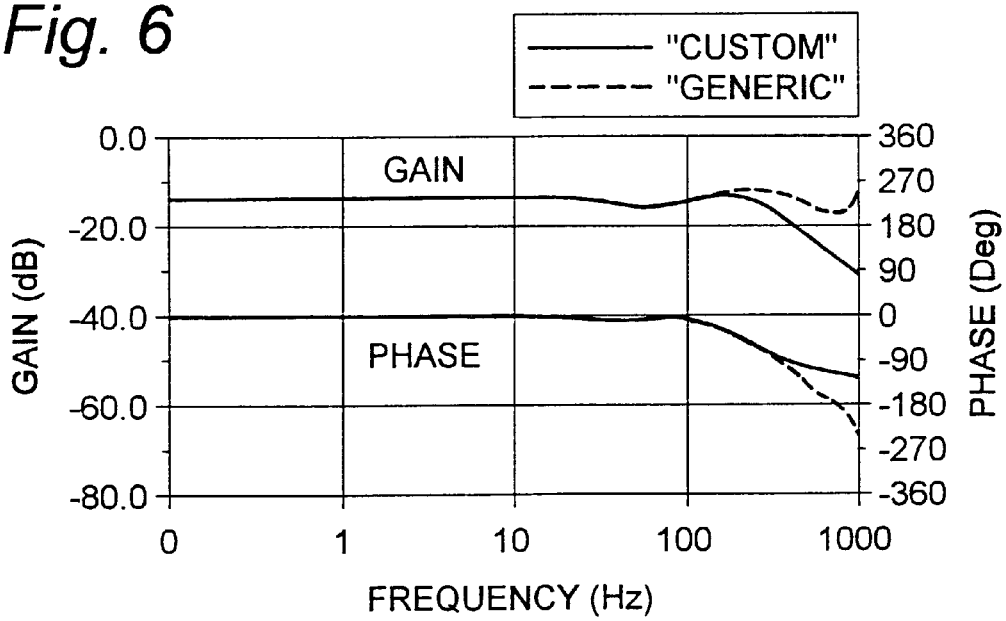
FIG. 6 is a plot of an analytical example of custom versus compensated generic current response.
Figure 7:
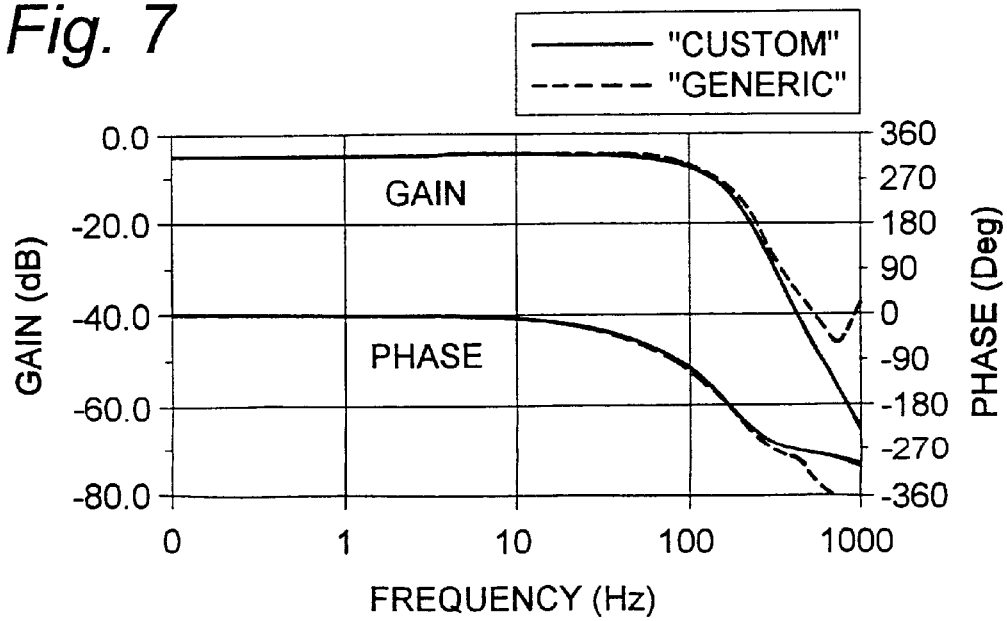
FIG. 7 is a plot of an analytical example of custom versus compensated generic valve response.
Figure 8:
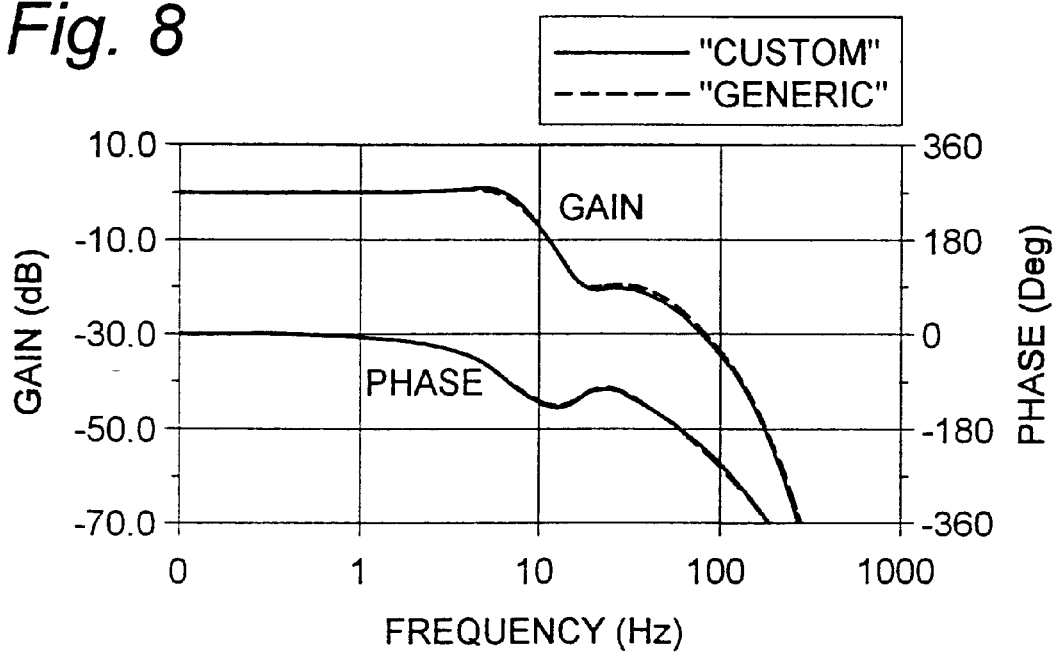
FIG. 8 is a plot of an analytical example of custom versus compensated generic ram response.

The first steps are to collect current loop frequency response data using the "custom" C(jw) 80 and "generic" G(jw)servoamplifiers 81. A typical comparison of these responses is shown in FIG. 4. In this case, the "generic" servoamplifier provides less performance than is required for the application. The responses are then ratioed mathematically to form the frequency response requirement for the compensator 82. The compensator is easily designed using one of a number of curve fitting techniques which will match a transfer function to the ratioed frequency response 82. The transfer function may be fit directly in the digital domain or may be fit to an analog or "LaPlace" domain and subsequently transformed to a digital form prior to software implementation. At this point, the designer also has some flexibility to trade off compensator complexity versus quality of fit in order to reduce digital processor throughput requirements. A typical match is shown in FIG. 5. FIG. 6 is a comparison of the custom current loop response versus the compensated generic current loop response. The compensation provides identical phase response to the custom design up through 300 Hz at a cost of increased gain at higher frequencies. The design tradeoff is retaining the phasing of the "custom" servoamplifier, which can affect the valve motion versus potential stability problems induced by higher gain. In general, some level of gain increase is acceptable since the mechanical dynamics of the valve do not respond to higher frequencies. FIG. 7 is a comparison of valve response using the custom versus generic current loops. The valve loop in this example also includes an additional compensator to account for differences in the "custom" and "generic" demodulator filters in the two respective configurations. The valve loop compensation is designed using a similar curve fitting technique in this example. The benefit of matching the valve response to that of the custom design is to insure the transient effects on the hydraulic supply remain constant, which is important if replacing the actuation control electronics in a legacy system. FIG. 8 compares actuator main ram response. A good match in ram response insures that the actuator's ability to control the vehicle or system it is used in is not affected by the use of "generic" loop closure electronics.

In the drawings and specification, there has been set forth a preferred embodiment of the invention, and, although specific terms are employed, the terms are used in a generic and descriptive sense only and not for purposes of limitation, the scope of the invention being set forth in the following claims.

What is claimed and desired to be secured by Letters Patent of the United States is:

1. An actuator loop closure electronic system for accepting an actuator position command input and electrically energizing a motor coil of a direct drive valve that provides valve position feedback, said direct drive valve in turn controlling a main ram of an actuator, said main ram providing ram position feedback, said actuator loop closure electronic system comprising:

a ram position error summer for generating a ram error signal from two inputs of an actuator position command and a ram position feedback signal;

a valve position error summer for generating a valve error signal from two inputs of said ram error signal and a valve position feedback signal;

a servoamplifier compensator for modifying said valve position error signal into a compensated valve position error signal;

a servoamplifier comprised of a servoamplifier summer, a servoamplifier current drive, a servoamplifier current sensor, and a servoamplifier current feedback for electrically energizing said motor coil;

said servoamplifier summer for generating a motor coil current error signal from two inputs of said compensated valve position error signal and a motor coil current feedback signal;

a servoamplifier current drive for amplifying said motor coil current error signal to energize said motor coil;

a servoamplifier current sensor for detecting current in said motor coil providing a sensed current signal; and a servoamplifier current feedback for adjusting sensed current signal into a motor coil current signal.

2. An actuator loop closure electronics system of claim 1 which further comprises:

a valve position feedback means for interfacing with a plurality of valve position sensor types; and an actuator position feedback means for interfacing with a plurality of actuator position sensor types.

3. An electrically-controlled actuator apparatus for accepting an actuator position command input and mechanically repositioning a work piece comprising:

a motor coil;

a direct drive valve whose valve is repositioned due to electrical energizing of said motor coil, said direct drive valve and said motor coil in combination having a dynamic position response related to electrical energizing of said motor coil;

a valve position sensor for generating a valve position signal based on the position of said direct drive valve;

a flow gain means controlled by said direct drive valve for providing mechanical energy;

a main ram that is repositioned by said flow gain means;

a main ram position sensor for generating a main ram position signal based on the position of said main ram;

a ram position error summer for generating a ram error signal from two inputs of an actuator position command and a ram position feedback signal;

a valve position error summer for generating a valve error signal from two inputs of said ram error signal and a valve position feedback signal;

a servoamplifier compensator for modifying said valve position error signal into a compensated valve position error signal;

a servoamplifier comprised of a servoamplifier summer, a servoamplifier current drive, a servoamplifier current sensor, and a servoamplifier current feedback for electrically energizing said motor coil;

said servoamplifier summer for generating a motor coil current error signal from two inputs of said compensated valve position error signal and a motor coil current feedback signal;

a servoamplifier current drive for amplifying said motor coil current error signal to energize said motor coil;

a servoamplifier current sensor for detecting current in said motor coil providing a sensed current signal; and a servoamplifier current feedback for adjusting sensed current signal into a motor coil current signal.

4. The electrically controlled actuator apparatus of claim 3 in which further comprises:

the valve position sensor is further comprised of a variable differential transducer that provides a first and second valve position signal referenced to a center point;

a first demodulator/filter that acts upon the first valve position signal to extract a first analog valve signal related to valve position;

a second demodulator filter that acts upon the second valve position signal to extract a second analog valve feedback signal related to valve position;

a first analog-to-digital converter that acts upon the first analog valve feedback signal to provide a first digital valve feedback signal;

a second analog-to-digital converter that acts upon the second analog valve feedback signal to provide a second digital valve feedback signal;

a first digital sum and difference device to find a sum of the first and second digital valve feedback signals whose variance from a threshold value indicates a fault, said first digital sum and difference device also to find a difference of the first and second digital valve feedback signals to provide a valve position feedback signal.

5. The electrically controlled actuator apparatus of claim 3 in which further comprises:

the actuator position sensor is further comprised of a variable differential transducer that provides a first and second actuator position signal referenced to a center point;

a third demodulator/filter that acts upon the first actuator position signal to extract a first analog actuator feedback signal related to actuator position;

a fourth demodulator filter that acts upon the second actuator position signal to extract a second analog actuator feedback signal related to actuator position;

a third analog-to-digital converter that acts upon the first analog actuator signal to provide a first digital actuator signal;

a fourth analog-to-digital converter that acts upon the second analog actuator signal to provide a second digital actuator signal;

a second digital sum and difference device to find a sum of the first and second digital actuator signals whose variance from a threshold value indicates a fault, said second digital sum and difference device also to find a difference of the first and second digital actuator signals to provide a actuator position feedback signal.

6. A method for developing a servoamplifier compensator for optimizing the dynamic response of a direct drive valve when energized by a servoamplifier comprising the steps of:

computing a custom current loop frequency response of a custom servoamplifier matching and in combination with a direct drive valve;

determining an unmatched current loop frequency response of an unmatched servoamplifier used in combination with said direct drive valve;

calculating a frequency response ratio of said custom current loop frequency response to said unmatched current loop frequency response;

finding a transfer function that fits said frequency response ratio over a frequency range of concern for said direct drive valve; and implementing said transfer function into said servoamplifier compensator.

* * * * *